United States Patent Office  3,511,834
Patented May 12, 1970

3,511,834
SUBSTITUTED 4,4-BIS(2-[1,3,4-OXADIAZOLYL])
STILBENES
Adolf Emil Siegrist, Basel, Erwin Maeder, Aesch, Basel-Land, Peter Liechti, Binningen, and Leonardo Gugliel-metti, Birsfelden, Switzerland, assignors to Ciba Limited, Basel, Switzerland, a company of Switzerland
No Drawing. Continuation-in-part of application Ser. No. 463,323, June 11, 1965. This application Sept. 5, 1967, Ser. No. 665,298
Claims priority, application Switzerland, June 15, 1964, 7,796/64
Int. Cl. C07d 85/54
U.S. Cl. 260—240          11 Claims

ABSTRACT OF THE DISCLOSURE

New 4,4′-disubstituted stilbenes are provided which may be represented by the general formula

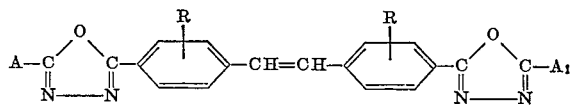

where A and $A_1$ are identical or different and each represents an aryl, an aralkenyl radical forming a system of conjugated double bonds with the aryl radical and the diazole nucleus or a heterocyclic radical of aromatic nature; R represents hydrogen, halogen, alkyl, halogenalkyl, cyano, cyanoalkyl, the carboxyl group, the carboxylic acid ester group and the carboxylic acid amide group.

The above-described compounds are especially useful as optical brighteners for organic material.

CROSS-REFERENCES TO RELATED APPLICATIONS

This is a continuation-in-part of application Ser. No. 463,323, filed June 11, 1965, now abandoned.

SUMMARY OF THE INVENTION

The present invention provides new 4,4′-disubstituted stilbenes which may be represented by the general formula

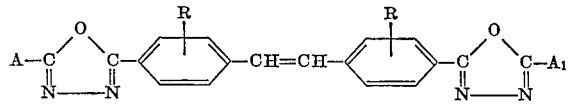

where A and $A_1$ are identical or different and each represents an aryl, an aralkenyl radical forming a system of conjugated double bonds with the aryl radical and the diazole nucleus or a heterocyclic radical of aromatic nature; R represents hydrogen, halogen, alkyl, halogen alkyl, cyano, cyanoalkyl, the carboxyl group, the carboxylic acid ester group and the carboxylic acid amide group.

The above-described compounds are especially useful as optical brighteners for organic material.

More specifically the present invention provides valuable, new 4,4′-disubstituted stilbenes of the general formula (1)

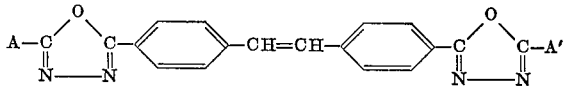

wherein A and A′ represents a member selected from the group consisting of the phenyl, naphthyl, styryl, stilbenyl, pyridyl, thienyl, furoyl, benzoxazolyl thienyl and benzoxazolyl phenyl residue which itself may contain one to two substituents Q, in which Q stands for a member selected from the group consisting of hydrogen, halogen, alkyl containing 1 to 18, preferably 1 to 12 carbon atoms, alkoxy containing 1 to 8 carbon atoms, phenyl, carboxyl, carboxylic acid alkyl ester containing 1–18, preferably 1 to 12 carbon atoms in the alkyl portion, carboxylic acid phenylalkylester with 1–4 carbon atoms in the alkyl, carboxylic acid amide, nitrile, carboxylic acid monoalkyl amide and dialkylamide with 1 to 12 carbon atoms in the alkyl portion, carboxylic acid morpholide, carboxylic acid anilide, carboxylic acid phenylalkyl amide with 1–4 carbon atoms in the alkyl, sulfonic acid, sulfonic acid alkyl ester containing 1–18, preferably 1 to 12 carbon atoms, sulfonic acid benzylester, sulfonic acid phenyl ester, sulfonic acid amide, sulfonic acid alkyl amide containing 1 to 18, preferably 1 to 12 carbon atoms, sulfonic acid benzylamide and sulfonic acid anilide.

Preferred compounds of the Formula 1 are those which are of a symmetrical structure and correspond to the formula (1a)

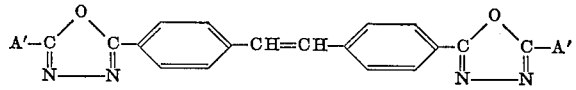

where A′ represents a member selected from the group consisting of a phenyl, naphthyl and styryl residue which itself may contain one to two substituents Q, in which Q stands for a member selected from the group consisting of hydrogen, halogen, alkyl containing 1–8 carbon atoms, alkoxy containing 1–8 carbon atoms, phenyl, carboxyl, lower alkyl carboxylic acid ester, carboxylic acid amide, nitrile, sulfonic acid, lower alkyl sulfonic acid ester and sulfonic acid amide.

Compounds of specific interest are those of Formula 2

(2)

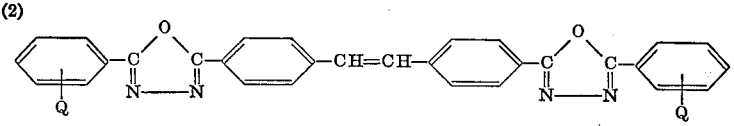

where Q represents a member selected from the group consisting of hydrogen, halogen, alkyl containing 1–8 carbon atoms, alkoxy containing 1 to 8 carbon atoms, phenyl, carboxyl, lower alkyl carboxylic acid ester, carboxylic acid amide, sulfonic acid, lower alkyl sulfonic acid ester and sulfonic acid amide, as well as those of the formula (2a)

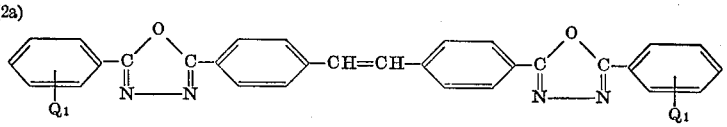

where $Q_1$ represents a member selected from the group consisting of hydrogen, halogen, alkyl containing 1–8 carbon atoms, alkoxy containing 1 to 8 carbon atoms, phenyl, carboxyl, carboxylic acid alkyl ester with 1 to 8 carbon atoms in the alkyl, carboxylic acid amide, sulfonic acid, sulfonic acid alkyl ester with 1 to 8 carbon atoms and sulfonic acid amide.

Special mention among the compounds of Formula 2 deserve those which correspond to the formula (3)

$$Q_2 \text{-Ph-}\underset{N-N}{\underset{|}{C}}\underset{}{\overset{O}{\diagdown}}\underset{}{C}\text{-Ph-CH=CH-Ph-}\underset{N-N}{\underset{|}{C}}\underset{}{\overset{O}{\diagdown}}\underset{}{C}\text{-Ph-}Q_2$$

where $Q_2$ represents an alkyl group containing 1 to 4 carbon atoms.

Another specific group of compounds according to Formula 2 corresponds to the formula (4)

$$Q_3 \text{-Ph-}\underset{N-N}{\underset{|}{C}}\underset{}{\overset{O}{\diagdown}}\underset{}{C}\text{-Ph-CH=CH-Ph-}\underset{N-N}{\underset{|}{C}}\underset{}{\overset{O}{\diagdown}}\underset{}{C}\text{-Ph-}Q_3$$

where $Q_3$ represents the sulfonic acid group, water soluble salt of the sulfonic acid, sulfonic acid alkyl amide containing 1 to 12 carbon atoms, sulfonic acid alkyl ester containing 1 to 12 carbon atoms, and the sulfonic acid phenyl ester which may be substituted by lower alkyl.

Preferred compounds according to Formula 4 are those which correspond to the formula (5)

$$XO_3S\text{-Ph-}\underset{N-N}{\underset{|}{C}}\underset{}{\overset{O}{\diagdown}}\underset{}{C}\text{-Ph-CH=CH-Ph-}\underset{N-N}{\underset{|}{C}}\underset{}{\overset{O}{\diagdown}}\underset{}{C}\text{-Ph-}SO_3X$$

where X stands for hydrogen, alkali metal, earth alkali metal, ammonium or an amine salt ion.

The new stilbene derivatives of the Formula 1 can be prepared by methods as such known. Symmetrical compounds of the Formula 1, are obtained when acylhydrazines of the formula (6)

$$\underset{HN-NH}{\underset{|}{A-C}}\underset{}{\overset{O}{\diagdown}}\underset{}{C}\text{-Ph-CH=CH-Ph-}\underset{HN-NH}{\underset{|}{C}}\underset{}{\overset{O}{\diagdown}}\underset{}{C-A}$$

where the two A's are identical radicals of the indicated kind—are treated with dehydrating agents, especially with thionylchloride.

The symmetrical acylhydrazines of the Formula 6 themselves are obtained by reacting in the molecular ratio of 1:2 stilbene-4,4'-dicarboxylic acid dihydrazide of the formula (7)

$$H_2N-NH-\overset{O}{\underset{}{C}}\text{-Ph-CH=CH-Ph-}\overset{O}{\underset{}{C}}\text{-HN-NH}_2$$

with a monocarboxylic acid chloride of the formula (8)

$$A-\overset{O}{\underset{Cl}{C}}$$

or stilbene-4,4'-dicarboxylic acid dichloride of the formula (9)

$$\overset{O}{\underset{Cl}{C}}\text{-Ph-CH=CH-Ph-}\overset{O}{\underset{Cl}{C}}$$

with a monocarboxylic acid hydrazide of the formula (10)

$$A-\overset{O}{\underset{HN-NH_2}{C}}$$

As examples of carboxylic acids of the formula A—COOH whose halides or hydrazides are suitable as starting materials for the manufacture of acylhydrazides of the Formula 6 there may be mentioned:

Benzenecarboxylic acids of the formulae (11)

$$\underset{Q_1}{\text{Ph}}\text{-COOH}$$

and (12)

$$\underset{Q_1, Q_1}{\text{Ph}}\text{-COOH}$$

where $Q_1$ has the same meaning as in the Formula 2, such as 2-, 3- or 4-methylbenzenecarboxylic acid, 2-, 3- or 4-chlorobenzenecarboxylic acid, 4-tertiary butylbenzenecarboxylic acid, 4-n-octylbenzenecarboxylic acid, 2-, 3- or 4-methoxybenzenecarboxylic acid, 2-, 3- or 4-ethoxybenzenecarboxylic acid, 4-octylhydroxybenzenecarboxylic acid, 2-, 3- or 4-sulfobenzenecarboxylic acid, 2-, 3- or 4-carboxybenzenecarboxylic acid; furthermore naphthalene-α- or -β-carboxylic acid, cinnamic acid, 2-chlorocinnamic acid, 2- or 3-methylcinnamic acid, pyridine-2-, -3- or -4-carboxylic acid, furan-2-carboxylic acid and thiophenecarboxylic acids such as thiophene-2-carboxylic acid, 3- or 5-methylthiophene-2-carboxylic acid, 3,5-dimethylthiophene-2-carboxylic acid.

The reactions required to manufacture the symmetrical dioxdiazolyl-stilbenes of the Formula 1 and the starting materials of the Formula 6 can be performed in the usual, known manner. Inter alia, the acid chlorides are reacted with the acid hydrazides advantageously in the presence of an acid acceptor e.g. in a pyridine base such as a picoline or in pyridine.

A dehydrating agent particularly suitable for the conversion of acylhydrazines of the Formula 6 into symmetrical di-oxdiazolyl-stilbenes of the Formula 1 is thionylchloride, among other reasons because the ring closure may be performed in an excess of this dehydrating agent, which at the same time acts also as solvent, whereupon the unconsumed thionylchloride can be removed with ease.

It has proved particularly advantageous to perform the reaction giving rise to the corresponding acylhydrazines in a high-boiling, inert unpolar or at most weakly polar organic solvent, for example in ortho-dichlorobenzene or trichlorobenzene in the presence of the stoichiometrically required proportion of pyridine bases as temperatures ranging from 50 to 150° C. because the subsequent ring closure giving rise to the 1,3,4-oxdiazole, without intermediate separation of the acylhydrazine, by dropping slightly more than the stoichiometrically needed proportion of thionylchloride at the boiling temperature of the reaction mixture (at a temperature from 120 to 220° C.), proceeds very rapidly and smoothly, that is to say that the manufacture of compounds of the Formula 1 or 2 starting from the hydrazines can unexpectedly be carried out as a one-stage process.

Asymmetrical stilbene derivatives of the Formula 1 are obtained when diacylhydrazines of the formula

(13) 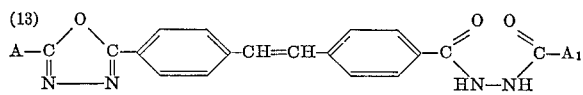

where A and $A_1$ are different radicals of the indicated kind—are treated with a dehydrating agent, especially with thionylchloride.

The diacylhydrazines of the Formula 13 are obtained when monocarboxylic acid hydrazides of the Formula 10 are reacted in the presence of an organic solvent, e.g. chlorobenzene, with stilbene-4,4'-dicarboxylic acid monomethyl ester chloride of the formula

(14) 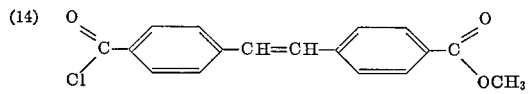

whereupon the resulting acylhydrazine of the formula

(15) 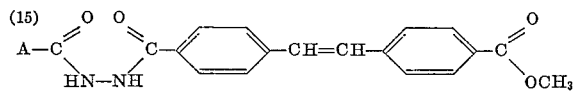

is treated—if necessary after first having been isolated—with a dehydrating agent, especially thionylchloride. In the so formed oxdiazolylstilbene derivative of the formula

(16) 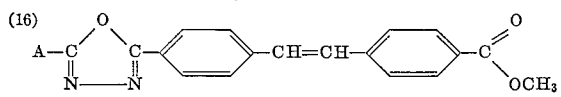

the carboxylic acid methyl ester group bound with the stilbene radical is converted into a carboxylic acid hydrazide group and the corresponding monoacylhydrazines are condensed with monocarboxylic acid chlorides of the formula

(17) 

to form the diacylhydrazines of the Formula 13. For this purpose there may be used as monocarboxylic acid chlorides of the Formula 17 those of the monocarboxylic acids mentioned above.

New 4,4'-disubstituted stilbenes of the Formula 1a are also obtained when mixtures of sulfur (in a stoichiometric excess) and methylphenyl oxdiazoles of the formula

(18) 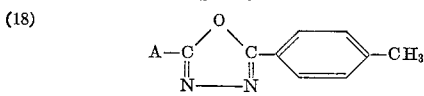

are heated to temperatures above 200° C. This route can be represented by the following formulae:

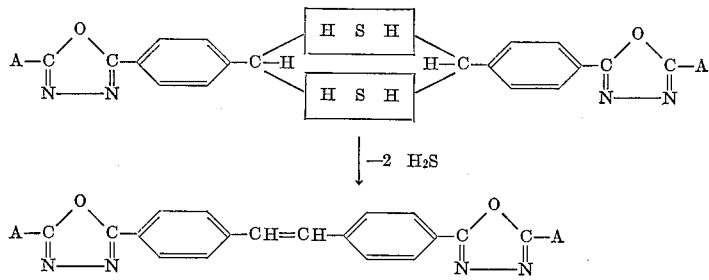

According to another process for the manufacture of 4,4'-disubstituted stilbenes of the Formula 1a dihydrostilbene compounds of the formula

(19) 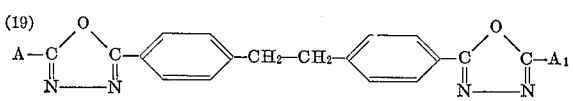

where A and $A_1$ have the above meanings—are treated with a dehydrogenating agent e.g. with sulfur, chlorine or with palladium and air.

The oxdiazole derivatives of the present invention can also be prepared by the action of imidoethers upon the corresponding carboxylic acid hydrazides at elevated temperatures and in the presence of a solvent.

The new optical brighteners of the composition defined above display in the dissolved and finely dispersed state a more or less pronounced fluorescence. They may be used for optically brightening a very wide variety of high-molecular or low-molecular organic materials or materials containing organic substances.

As examples of such materials the following groups of organic materials, insofar as they are at all of interest for optical brightening, may be mentioned, but this enumeration is not intended to have any restrictive effect whatsoever.

(I) Synthetic organic high-molecular or higher-molecular materials:

(a) Polymers based on organic compounds containing at least one polymerizable carbon-to-carbon double bond, i.e. their homopolymers and copolymers and the products obtained by after-treating them such, for example, as the products formed by cross-linking, graft polymerization, degradation, polymer blends etc., for example: polymers based on α,β-unsaturated carboxylic acids, especially of acryl compounds (e.g. acrylic esters, acrylic acids, acrylonitrile, acrylamides and their derivatives, or their corresponding methacryl analogs), of olefine hydrocarbons (e.g. ethylene, propylene, isobutylene, styrenes, dienes, especially butadiene, isoprene i.e. also rubber and rubber-like polymers; furthermore, so-called ABS polymers); polymers based on vinyl and vinylidene compounds (such e.g. as vinylesters, vinylchloride, vinylsulfonic acid, vinyl-ethers, vinyl alcohol, vinylidenechloride, vinylcarbazole), of halogenated hydrocarbons (chloroprene, highly halogenated ethylenes), of unsaturated aldehydes and ketones (e.g. acrolein and the like), of allyl compounds and the like, graft polymers (e.g. by graft polymerization of vinylmonomers), cross-linking products (obtained e.g. with bifunctional or polyfunctional cross-linking agents such as divinylbenzene, polyfunctional allyl compounds or bis-acryl compounds) or products accessible by partial degradation (hydrolysis, depolymerization) or modification of reactive groupings (e.g. esterification, etherification, halogenation self-crosslinking).

(b) Other polymers, such as those accessible by opening of the ring e.g. polyamides of the polycaprolactam type, furthermore formaldehyde polymers, or polymers accessible both by polyaddition and by polycondensation, such as polyethers, polythioethers, polyacetals, thioplasts.

(c) Polycondensates or precondensates based on bifunctional or polyfunctional compounds containing condensable groups, their homocondensates and co-condensates and products obtained by after-treating them, of which the following may be mentioned as examples: Polyesters, saturated (e.g. polyethylene terephthalates) or unsaturated (e.g. maleic acid-dialcohol polycondensates and their cross-linking products with copolymerizable vinyl-monomers), unbranched and branched (also on the basis of polyhydric alcohols such, for example, as alkyd resins). Polyamides (e.g. hexamethylenediamine adipate), maleinate resins, melamine resins, phenolic resins (Novolak), aniline resins, furan resins, carbamide resins and their precondensates and similarly constituted products, polycarbonates, silicone resins and others.

(d) Polyaddition products such as polyurethanes (both cross-linked and not cross-linked), epoxy resins.

(II) Semisynthetic organic materials such, for example, as cellulose esters and mixed esters (acetate, propionate), nitrocellulose, cellulose ethers, regenerated cellulose (viscose rayon, cuprammonium cellulose) or their aftertreatment products, casein-based synthetics.

(III) Natural organic materials of animal or vegetable origin, for example based on cellulose or proteins such as wool, cotton, silk, bast, jute, hemp, skins and hairs, leather, finely dispersed wood masses, natural resins (such as colophony, especially lacquer resins), also rubber, gutta percha, balata and their atfer-treatment and modification products (curing and cross-linking), degradation products (hydrolysis, depolymerization), graft polymerization products, products obtained by conversion of reactive groups (acylation, halogenation, cross-linking or the like).

The organic materials that come into consideration may be in a wide range of processing stages (raw materials, semi-finished products or finished products) and physical states. They may be in the form of materials shaped in a wide variety of ways, that is to say e.g. predominantly three dimensional objects like blocks, sheets, sections, tubes, injection mouldings or objects machined in a variety of ways, chips or granules, foamed articles; predominantly two-dimensional materials such as films, foils, lacquers, tapes, coatings, impregnations and coatings or predominantly mono-dimensional materials such as filaments, fibers, fiber tufts, bristles or wires. The afore-mentioned materials may also be in the unshaped state in a wide variety of homogeneous or inhomogeneous distribution and physical states, e.g. in the form of powders, solutions, emulsions, dispersions, latices (examples: lacquer solutions, polymer dispersions), sols, gels, putties, pastes, waxes, adhesives, pore fillers and the like.

Fibrous materials may take e.g. the form of continuous filaments, staple fibers, fiber tufts, hanks, textile threads, yarns, double yarns, fiber fleeces, felts, cottonwool, flocked materials or of woven textile fabrics or composite textile materials, woven fabrics or of papers and cardboards or paper pulps or the like.

The compounds to be used according to this invention are of special value for the treatment of textile organic materials, especially woven textile wabrics. If fibers are to be optically brightened according to this invention, and are present in the form of staple fibers or continuous fibers, hanks, woven or knitted fabrics, fleeces, flocked substrates or composite materials, this is advantageously carried out in an aqueous medium in which the compound concerned is finely dispersed (suspension, or if desired solution).

If desired, the treatment may be carried out in the presence of a dispersant, e.g. soaps, polyglycol ethers of fatty alcohols, fatty amines or alkylphenols, cellulose sulfite waste liquor or condensates of unmodified or alkylated naphthalenesulfonic acids with formaldehyde. It has proved particularly advantageous to perform the treatment in a neutral, weakly alkaline or acidic bath. It is likewise advantageous to carry out the treatment at a raised temperature of about 50 to 100° C., for example at the boiling temperature of the bath or in its neighbourhood (at about 90° C.). The improvement according to this invention may also be performed with solutions in organic solvents.

The new optical brighteners to be used in the present process may also be added to or incorporated with the materials before or during the shaping of the latter. Thus, for example, they may be added during the manufacture of films, foils, tapes or shaped materials to the moulding composition or injection moulding composition, or dissolved, dispersed or in any other suitable manner finely distributed in the spinning mass before spinning. The optical brighteners may also be added to the starting materials, reaction mixtures or intermediate products used for the manufacture of fully synthetic or semisynthetic organic materials, thus also before or during the chemical reaction, e.g. a polycondensation (including the precondensates), a polymerization (including the prepolymers) or a polyaddition.

The new optical brighteners may, of course, also be used wherever organic materials of the kind defined above are combined with inorganic materials in any desired form (typical examples are detergents, white pigments in organic substances).

The new optical brighteners are distinguished by their particularly good thermal stability and fastness to light and migration.

The amount of the new optical brighteners to be used in the present invention, referred to the material to be optically brightened, may vary within wide limits. Even a very small amount, in some cases e.g. as little as 0.001% by weight, will produce a distinct and durable effect, though amounts of up to about 0.5% by weight or even more may likewise be used. For most practical purposes a preferred amount ranges from 0.01 to 0.2% by weight.

The new compounds may be used as brightening agents, for example, also in the following manner:

(a) In admixture with dyestuffs or pigments or as additives to dyebaths, printing, discharge and reserve paste. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents or dressing agents such as starches or synthetic dressing agents.

The products of this invention may also be added with advantages to the liquors used for rendering textile materials crease-resistant.

(d) In combination with detergents. The detergents and brightening agents may be added separately to the washing liquors. It is also advantageous to use detergents that as such contain a share of brightener. Suitable detergents are e.g. soaps, salts of sulfonate washing agents e.g. of sulfonated benzimidazoles substituted by higher alkyl radicals on the 2-carbon atoms; also salts of monocarboxylic acid esters of 4-sulfophthalic acid with higher fatty alcohols; also salts of fatty alcohol sulfonates, alkylarylsulfonic acids or condensation products of higher fatty acids with aliphatic hydroxysulfonic or aminosulfonic acids. Furthermore, there may be used non-ionic washing agents e.g.. polyglycol ethers derived from ethylene oxide and higher fatty alcohols, alkylphenols or fatty amines.

(e) In combination with polymeric vehicles (polymers, polycondensates or polyadducts) in which the brightening agent, if desired together with other substances, may be incorporated in the dissolved or dispersed form, e.g. in the case of coating, impregnating or binding agents (solutions, dispersions, emulsions) for textile materials, fleeces, paper or leather.

(f) As additives to a wide variety of industrial products to make them easier to market or to obviate shortcomings in their usefulness, for example as additives to glues, adhesives, paints and the like.

The compounds of the above formula may also be used as scintillators for various photographic purposes such as electrophotographic reproduction or for supersensitizing.

If the brightening process is combined with other treatment or improvement operations this combined treatment is advantageously carried out with the use of suitable stable preparations. Such preparations contain optical brighteners of the general formula shown above as well as dispersants, washing agents, carriers, dyestuffs, pigments or dressing agents.

For treating fibrous substrates (especially polyesters) with the optical brighteners of this invention it is of advantage to impregnate these fibers with an aqueous dispersion of the brightening agents at a temperature below 75° C., e.g. at room temperature, then to subject them to a dry heat treatment at a temperature above 100° C., as a rule after having advantageously pre-dried it at a moderately raised temperature, e.g. at least at 60° C. to about 100° C. The heat treatment in the dry state is then advantageously performed at a temperature from 120 to to 225° C., for example by heating in a drying chamber, by ironing within the indicated temperature range or by treatment with dry, superheated steam. The drying and the dry heat treatment may be carried out immediately one after the other or they may be combined in a single operational step.

and the residue is pasted with water, suctioned, washed with water until it is neutral and dried, to yield about 10.4 g. (=88.8% of theory) of 4,4′-di-[5″-phenyl-1″,3″,4″-oxdiazolyl-(2″)]-stilbene of the Formula 21

(21) 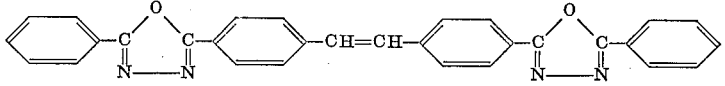

in the form of a yellow powder melting at 312.5 to 313° C. After three recrystallizations from ortho-dichlorobenzene with the aid of bleaching earth, pale greenish yellow, very fine needles melting at 319° C. are obtained.

Analysis.—$C_{30}H_{20}O_2N_4$, mol weight, 468.49. Calculated (percent): C, 76.91; H, 4.30; N, 11.96. Found (percent): C, 76.86; H, 4.16; N, 12.04.

The bis-diacylhydrazine of the Formula 20 used as starting material can be prepared as follows:

14.0 grams of benzoic acid monohydrazide are stirred in 300 ml. of pyridine, and at 5 to 10° C., 14.5 g. of stilbene-4,4′-dicarboxylic acid dichloride are added. The batch is stirred for one hour first while cooling with ice, then further at room temperature, and the colorless rather thickly liquid reaction product is heated within a further hour to 90 to 95° C. After stirring for 5 to 6 hours at 90 to 95° C. the reaction mixture is cooled to room temperature and poured into 5 liters of water. The reaction product is suctioned off, washed with cold and then with hot water and dried, to yield about 22.6 g. (=80.7% of theory) of bis-diacylhydrazine of the Formula 20 in the form of a colorless powder which melts at 345 to 345.5° C.

In a similar manner the following dioxdiazole derivatives can be manufactured:

(22) 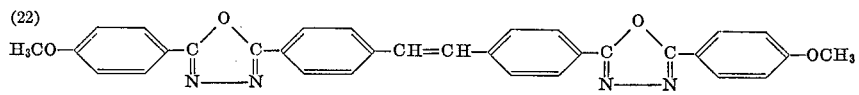

Yield: 81% of theory. Light yellow, fine crystals from ortho-dichlorobenzene, melting at 287 to 288° C.

Analysis.—$C_{32}H_{24}O_4N_4$, mol. weight, 528.54. Calculated (percent): C, 72.71; H, 4.58; N, 10.60. Found (percent): C, 72.24; H, 4.49; N, 10.37.

(23) 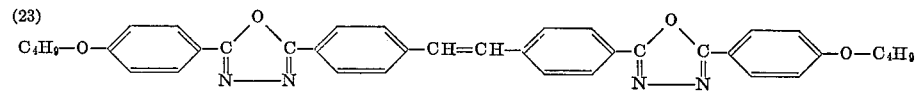

(24) 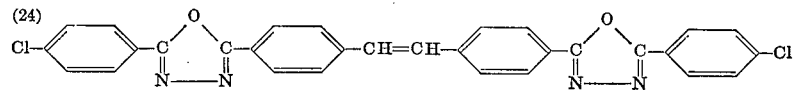

Example 1

12.6 grams of the bis-diacylhydrazine of the formula

(20) 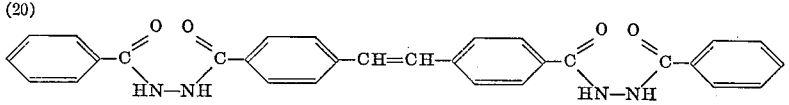

in 150 ml. of thionylchloride are stirred under reflux for 24 hours. The excess thionylchloride is then distilled off, Yield: 87.9% of theory. Greenish yellow, shiny needles and spangles from trichlorobenzene, melting at 379 to 380° C.

Analysis.—$C_{30}H_{18}O_2N_4Cl_2$ mol. weight, 537.41. Calculated (percent): C, 67.05; H, 3.38; N, 10.43. Found (percent): C, 67.03. H, 3.24; N, 10.40.

(25) 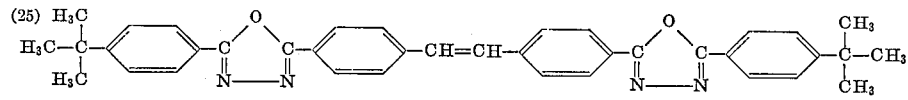

Yield: 67.6% of theory. Faintly greenish yellow, very fine crystals from ortho-dichlorobenzene, melting at 349–350° C.

Analysis.—$C_{38}H_{36}O_2N_4$ mol. weight, 580.70. Calculated (percent): C, 78.59; H, 6.25; N, 9.65. Found (percent): C, 78.41; H, 6.33; N, 9.84.

Yield: 78.4% of theory. Light-yellow, very fine crystals from dimethylformamide, melting at 368 to 369° C.

Analysis.—$C_{28}H_{18}O_2N_6$, mol. weight, 470.47. Calculated (percent): C, 71.48; H, 3.86; N, 17.86. Found (percent): C, 71.42; H, 4.12; N, 17.89.

(26)
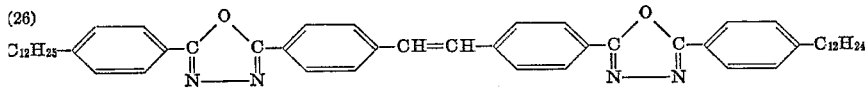

(27)
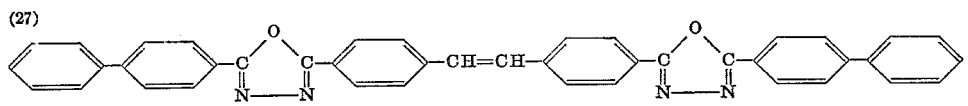

Yield: 77.4% of theory. Faintly yellowish, shiny, very fine crystals from ortho-dichlorobenzene, melting at 352–353° C.

Analysis.—$C_{42}H_{28}O_2N_4$, mol. weight, 620.68. Calculated (percent): C, 81.27; H, 4.55; N, 9.03. Found (percent): C, 81.10; H, 4.63; N, 9.15.

Example 2

A mixture of 38.1 g. of the bis-diacylhydrazine of the formula

(31)
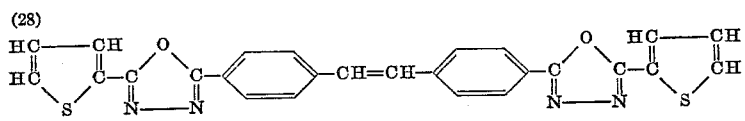

(28)
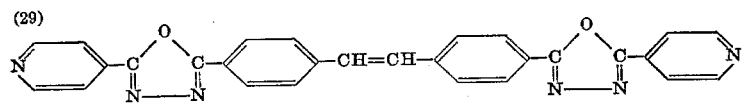

Yield: 82.6% of theory. Yellow, fine, shiny crystals from ortho-dichlorobenzene, melting at 296 to 297° C.

Analysis.—$C_{26}H_{16}O_2N_4S_2$, mol weight, 480.57. Calculated (percent): C, 64.98; H, 3.36; N, 11.66. Found (percent): C, 64.48; H, 3.34; N, 11.63.

and 300 ml. of thionyl chloride is refluxed and stirred for 24 hours. The excess thionylchloride is then distilled off and the residue triturated with water, suctioned, washed with water and dried, to yield about 14.9 g. corresponding to 41% of theory, of 4,4′-di[5″-para-octoxyphenyl-1″,3″,4″-oxdiazolyl-(2″)]-stilbene of the formula

(29)
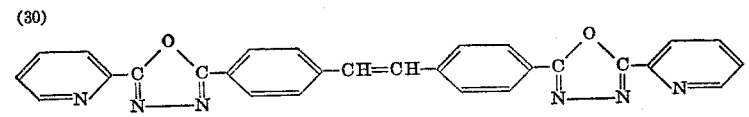

(32)
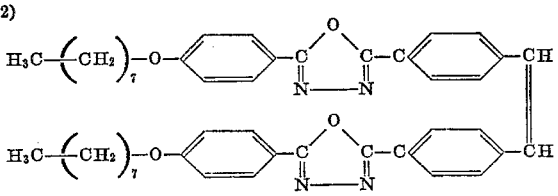

Yield: 88.5% of theory. Greenish-light yellow, fine felted needles from dimethylformamide, melting at 367 to 368° C.

Analysis.—$C_{28}H_{18}O_2N_6$ mol. weight, 470.47. Calculated (percent): C, 71.48; H, 3.86; N, 17.86. Found (percent): C, 71.47; H, 3.98; N, 17.88

(30)

in the form of a yellow powder which after several recrystallizations, first from dimethylformamide and then from dioxane, with the aid of active carbon melts at 287° C. It forms light-yellow, fine crystals.

Analysis.—$C_{46}H_{52}O_4N_4$, mol. weight, 724.91. Calculated (percent): C, 76.21; H, 7.23; N, 7.73 Found (percent): C, 76.49; H, 7.33; N, 7.90.

The bis-diacylhydrazine of the Formula 31 used as starting material can be prepared as described in Example 1 from 14.8 g. of stilbene-4,4'-dicarboxylic acid dihydrazide (by reacting an excess of hydrazine hydrate upon stilbene-4,4'-dicarboxylic acid diethyl ester at an elevated temperature) and 28.4 g. of para-n-octyloxy-benzoylchloride by reaction in pyridine in a very good yield.

The compound of the Formula 35 used as starting material can be prepared as described in Example 1 from dibenzyl-4,4'-dicarboxylic acid dichloride and benzoic acid monohydrazide, followed by cyclization with thionylchloride. Recrystallization from tetrachloroethylene yields colorless, shiny, felted needles melting at 239 to 240° C.

Analysis.—$C_{30}H_{22}O_2N_4$, mol. weight, 470.51. Calculated (percent): C, 76.58; H, 4.71; N, 11.91. Found (percent): C, 76.54; H, 4.76; N, 11.76.

In a similar manner 5.8 g. of the compound of the formula (36)

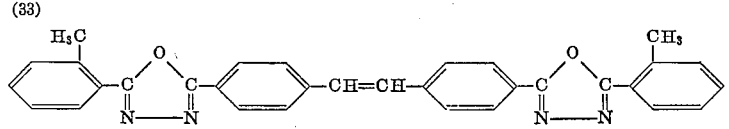

The following dioxdiazole derivatives can be prepared in a similar manner:

which forms colorless, shiny, small crystals from tetrachloroethylene, melting at 282–283° C.

(33)

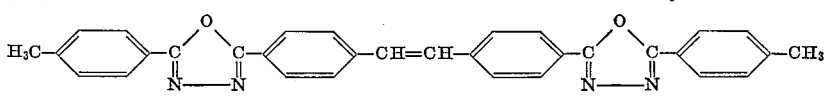

Yield: 46.2% of theory. Light, greenish yellow, very fine, felted needles from ortho-dichlorobenzene, melting at 305 to 306° C.

Analysis.—$C_{32}H_{24}O_2N_4$, mol. weight, 496.54. Calculated (percent): C, 77.40; H, 4.87; N, 11.28. Found (percent): C, 77.66; H, 5.03; N, 11.31.

(34)

Analysis.—$C_{38}H_{38}O_2N_4$, mol. weight, 582.72. Calculated (percent): C, 78.32; H, 6.57; N, 9.62. Found (percent): C, 78.47; H, 6.70; N, 9.88.

Yielded about 2.5 g. (=43% of theory) of the compound of the Formula 25 which, after 5 recrystallizations from tetrachloroethylene, forms light, greenish yellow, shiny needles melting at 344 to 345° C.

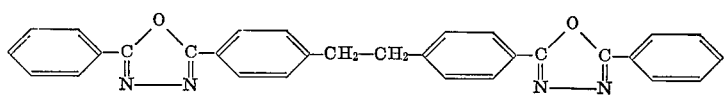

Yield: 52.4% of theory. Faintly yellowish, very fine crystals from ortho-dichlorobenzene, melting at 336 to 337° C.

Analysis.—$C_{32}H_{24}O_2N_4$, mol. weight, 496.54. Calculated (percent): C, 77.40; H, 4.87; N, 11.28. Found (percent): C, 77.26; H, 5.03; N, 11.41.

Analysis.—$C_{38}H_{36}O_2N_4$, mol. weight, 580.70. Calculated (percent): C, 78.59; H, 6.25; N, 9.65. Found (percent): C, 78.33; H, 6.55; N, 9.56.

Example 4

46.5 grams of 2-[4'-methylphenyl-(1')]-5-phenyl-1,3,4-oxdiazole of the formula (37)

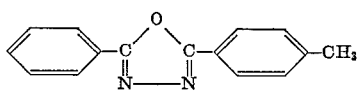

Example 3

4.7 grams of the compound of the formula (35)

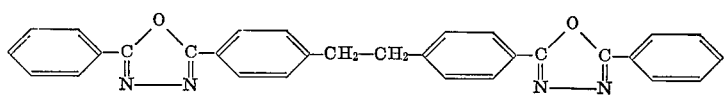

are fused together with 0.32 g. of flowers of sulfur, and the melt is stirred for 30 minutes at 290 to 300° C. During the cooling, the melt is dissolved in 50 ml. of ortho-dichlorobenzene, and the settled-out crystalline mass is diluted with 50 ml. of methanol. The batch is cooled, suctioned, washed with methanol and dried, to yield about 2.9 g. (=62% of theory) of 4,4'-di-[5''-phenyl - 1'',3'',4''-oxdiazolyl-(2'')] - stilbene of the Formula (21) in the form of a brownish yellow, crystalline powder melting at 292 to 295° C. After 5 recrystallizations from ortho-dichlorobenzene with the aid of bleaching earth there are obtained light-yellow, shiny, felted needles melting at 317 to 318° C.

Analysis.—$C_{30}H_{20}O_2N_4$, mol. weight, 468.49. Calculated (percent): C, 76.91; H, 4.30; N, 11.96. Found (percent): C, 76.97; H, 4.35; N, 12.00.

are fused together with 6.4 g. of flowers of sulfur, and the melt is stirred for 1½ hours at 290° C. When the evolution of hydrogen sulfide ceases, the melt is dissolved during the cooling with 400 ml. of tetrachloroethylene and then cooled to room temperature. After suctioning, washing with tetrachloroethylene and drying, there are obtained about 25.9 g. (=55.4% of theory) of 4,4'-di-[5'' - phenyl-1'',3'',4''-oxdiazolyl - (2'')]-stilbene of the Formula 21 in the form of a brownish yellow powder which after repeated recrystallization from ortho-dichlorobenzene with the aid of bleaching earth forms small, light, greenish yellow, shiny crystals melting at 315 to 316° C.

Analysis.—$C_{30}H_{20}O_2N_4$, mol. weight, 468.49. Calculated (percent): C, 76.91; H, 4.30; N, 11.96. Found (percent): C, 77.07; H, 4.56; N, 11.78.

Example 5

A mixture of 7.4 g. of stilbene-4,4'-dicarboxylic acid dihydrazide, 8.75 g. of 3-chlorobenzoylchloride, 8 g. of In a similar manner the following dioxdiazole derivatives can be prepared:

(39)
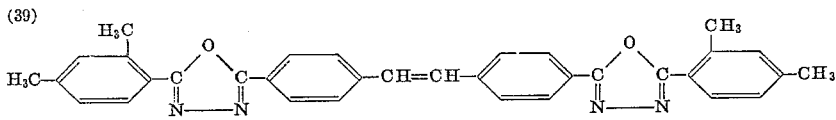

pyridine and 200 ml. of anhydrous ortho-dichlorobenzene is heated within 30 minutes to 100 to 110° C. while being stirred, then further stirred at this temperature for one hour and then heated in the course of 15 to 30 minutes to 165 to 170° C. 8 g. of thionylchloride are vigorously Yield: 77.8% of theory. Light-yellow, fine, felted needles from ortho-dichlorobenzene, melting at 299 to 300° C.

Analysis.—$C_{34}H_{28}O_2N_4$, mol. weight, 524.60. Calculated (percent): C, 77.84; H, 5.38; N, 10.68. Found (percent): C, 77.69; H, 5.38; N, 10.58.

(40)
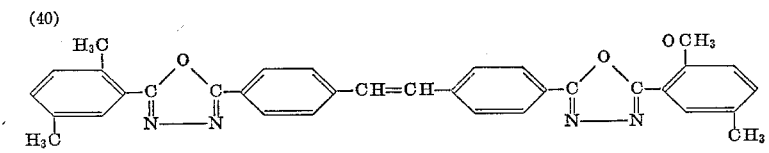

stirred dropwise within 15 minutes into the colorless suspension of the reaction product at 165 to 170° C., during which gradually a light-yellow coloration appears. The batch is stirred on for 5 minutes at this temperature, then cooled to about 5° C., and during the cooling 200 ml. of methanol are added. After suctioning, washing with Yield: 78.5% of theory. Light yellow, finely crystalline powder from ortho-dichlorobenzene, melting at 281 to 283° C.

Analysis.—$C_{34}H_{28}O_4N_4$, mol. weight, 556.60. Calculated (percent): C, 73.36; H, 5.07; N, 10.07. Found (percent): C, 72.82; H, 5.01; N, 10.11.

(41)
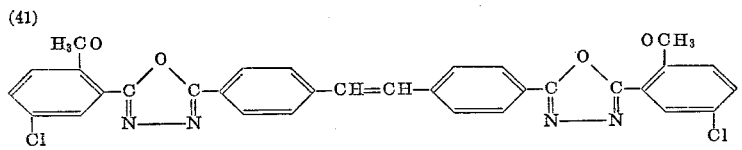

methanol and drying there are obtained about 11.7 g. (=87.1% of theory) of 4,4'-di-[5''-metachlorophenyl-1'',3'',4''-oxdiazolyl-(2'')]-stilbene of the formula Yield: 83% of theory. Pale yellow, fine, shiny crystals from ortho-dichlorobenzene, melting at 343 to 344° C.

Analysis.—$C_{32}H_{22}O_4N_4Cl_2$ mol. weight, 597.46. Calcu-

(38)
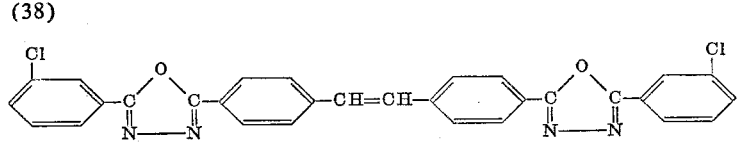

in the form of a faintly greenish yellow powder melting at 334 to 335° C. Three recrystallizations from ortholated (percent): C, 64.33; H, 3.71; N, 9.38. Found (percent): C, 64.05; H, 3.50; N, 9.09.

(42)
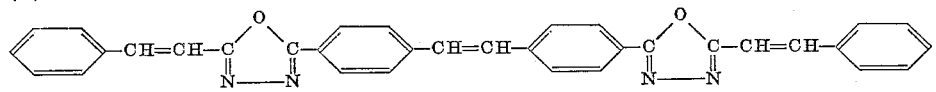

dichlorobenzene with the aid of bleaching earth furnish faintly green, fine crystals melting at 338 to 339° C.

Analysis.—$C_{30}H_{18}O_2N_4Cl_2$, mol. weight, 537.41. Calculated (percent): C, 67.05; H, 3.38; N, 10.43. Found (percent): C, 66.90; H, 3.28; N, 10.22.

Yield: 81.6% of theory. Faintly yellow, fine crystals from ortho-dichlorobenzene, melting at 315 to 316° C.

Analysis.—$C_{34}N_{24}O_2N_4$, mol. weight, 520.56. Calculated (percent): C, 78.44; H, 4.65; N, 10.76. Found (percent): C, 78.09; H, 4.81; N, 10.59.

(43)
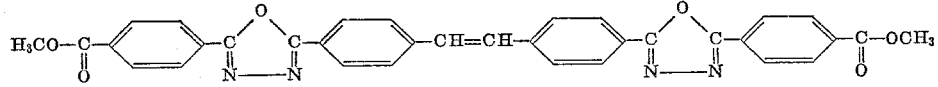

Yield: 43.3% of theory. Pale yellow, finely crystalline powder from trichlorobenzene, melting at 358 to 360° C.

*Analysis.*—C$_{34}$H$_{24}$O$_6$N$_4$, mol. weight, 584.56. Calculated (percent): C, 69.85; H, 4.14; N, 9.59. Found (percent): C, 69.79; H, 4.13; N, 9.52.

(44)
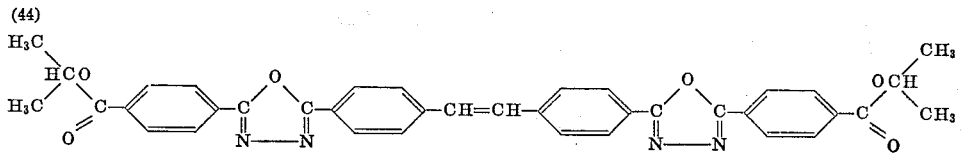

Yield: 71.8% of theory. Pale greenish yellow, finely crystalline powder from ortho-dichlorobenzene, melting above 400° C.

*Analysis.*—C$_{38}$H$_{32}$O$_6$N$_4$, mol. weight, 640.67. Calculated (percent): C, 71.24; H, 5.03; N, 8.75. Found (percent): C, 71.04; H, 4.95; N, 8.75.

(45)
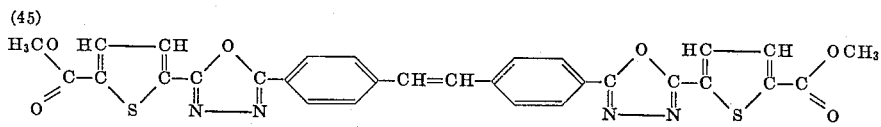

Yield: 88.5% of theory. Pale yellow, finely crystalline powder from ortho-dichlorobenzene, melting at 342 to 343° C.

*Analysis.*—C$_{30}$H$_{20}$O$_6$N$_4$S$_2$, mol. weight, 596.64. Calculated (percent): C, 60.39; H, 3.38; N, 9.39. Found (percent): C, 60.03; H, 3.49; N, 9.33.

In analogous manner the following compounds can be obtained.

Example 6

A mixture of 30.5 g. of stilbene-4,4'-dicarboxylic acid dichloride, 30.0 g. of para-methylbenzoic acid hydrazide, 32 g. of pyridine and 600 ml. of anhydrous orthodichlorobenzene is heated in the course of 15 to 30 minutes to 100 to 110° C. while being stirred, then stirred on at this temperature for one hour and in the course of another 20 to 30 minutes heated to 170° C. While vigorously stirring the almost colorless suspension, 32 g. of thionylchloride are dropped in at 165 to 170° C. within 20 minutes. The yellow, almost completely dissolved reaction product is stirred on at this temperature for 5 minutes, cooled to about 5° C. and during the cooling 600 ml. of methanol are added. After suctioning, washing with methanol and drying there are obtained about 41.8 g. (=84.3% of theory) of 4,4'-di-[5''-metamethylphenyl-1'',3'',4''-oxdiazolyl-(2'')]-stilbene of the formula

(46)
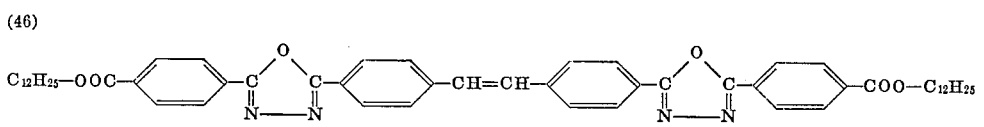

(47)
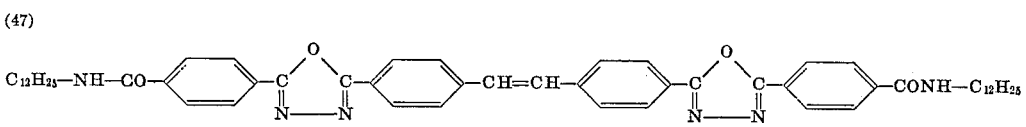

(48)
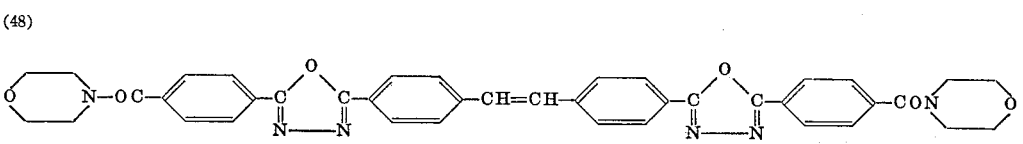

(49)
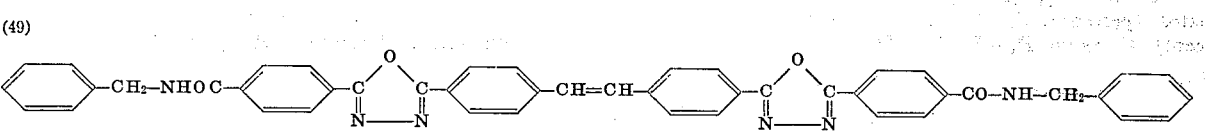

(50)
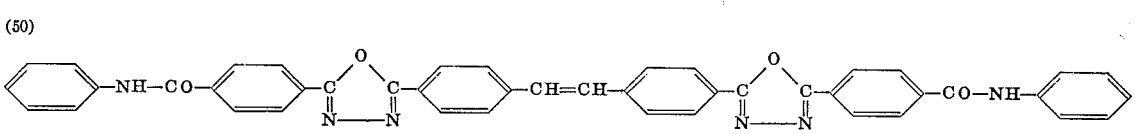

(51)
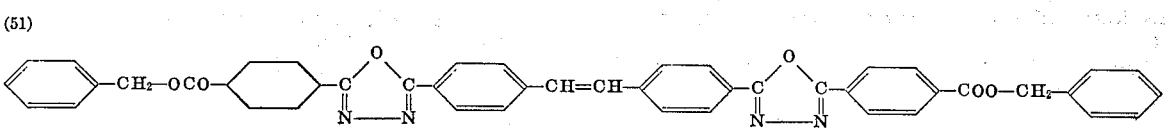

(52)

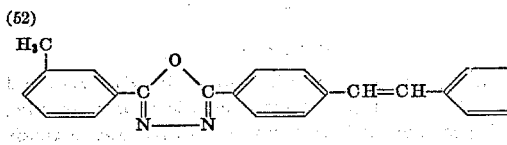 

in the form of a light-yellow powder melting at 267 to 268° C.

After having recrystallized it three times from ortho-dichlorobenzene with the aid of bleaching earth the product forms light greenish yellow, fine needles melting at 273 to 274° C.

Analysis.—$C_{32}H_{24}O_2N_4$, mol. weight, 496.54. Calculated (percent): C, 77.40; H, 4.87; N, 11.28. Found (percent): C, 76.99; H, 5.02; N, 11.15.

In a similar manner the following dioxdiazole derivatives can be prepared:

(53)

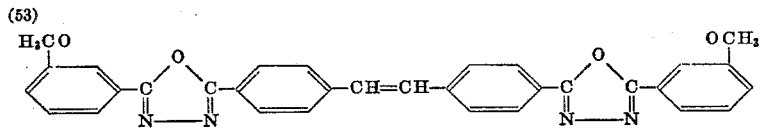

Yield: 70.4% of theory. Yellow, shiny, small needles from ortho-dichlorobenzene, melting at 273 to 274° C.

Analysis.—$C_{32}H_{24}O_4N_4$, mol. weight, 528.54. Calculated (percent): C, 72.71; H, 4.58; N, 10.60. Found, (percent): C, 72.26; H, 4.46; N, 10.36.

(54)

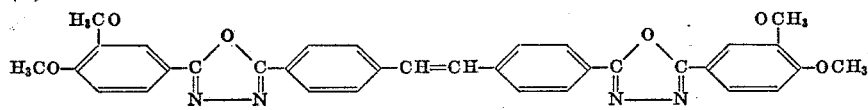

Yield: 67.3% of theory. Yellow, finely crystalline powder from ortho-dichlorobenzene, melting at 326 to 328° C.

Analysis.—$C_{34}H_{28}O_6N_4$, mol. weight, 588.60. Calculated, (percent): C, 69.37; H, 4.80; N, 9.52. Found (percent): C, 69.06; H, 4.72; N, 9.55.

(55)

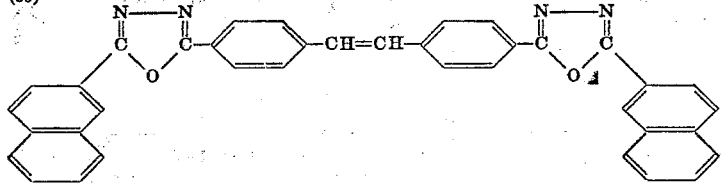

Yield: 83.2% of theory. Light, greenish yellow, felted crystals from ortho-dichlorobenzene, melting at 337 to 338° C.

Analysis.—$C_{38}H_{24}O_2N_4$, mol. weight, 568.60. Calculated (percent): C, 80.26; H, 4.25; N, 9.85. Found (percent): C, 80.18; H, 4.29; N, 9.91.

(56)

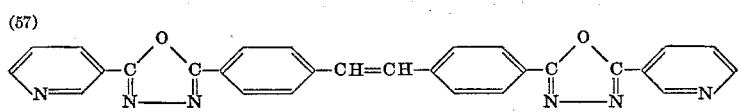

Yield: 92.2% of theory. Light yellow, very fine, shiny needles from trichlorobenzene, melting at 362 to 364° C.

Analysis.—$C_{46}H_{32}O_2N_4$, mol. weight, 672.75. Calculated (percent): C, 82.12; H, 4.79; N, 8.33. Found (percent): C, 81.40; H, 5.07; N, 8.31.

(57)

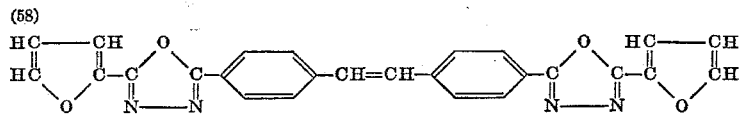

Yield: 83% of theory. Light yellow, very fine crystals from ortho-dichlorobenzene, melting at 322° C.

Analysis.—$C_{28}H_{18}O_2N_6$, mol. weight, 470.47. Calculated (percent): C, 71.48; H, 3.86; N, 17.86. Found (percent): C, 71.75; H, 3.99; N, 17.90.

(58)

Yield: 63.4% of theory. Yellow, finely crystalline powder from ortho-dichlorobenzene, melting at 275 to 279° C.

Analysis.—$C_{26}H_{16}O_4N_4$, mol. weight, 448.42. Calculated (percent): C, 69.64; H, 3.60; N, 12.50. Found (percent): C, 69.30; H, 3.79; N, 12.25.

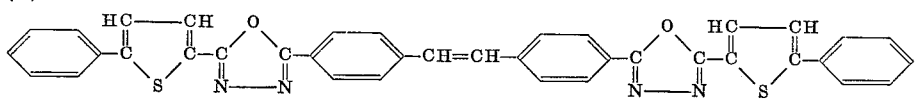

Yield: 86% of theory. Yellow, very fine crystals from trichlorobenzene, melting at 355 to 356° C.

Analysis.—$C_{38}H_{24}O_2N_4S_2$, mol. weight, 632.76. Calculated (percent): C, 72.13; H, 3.82; N, 8.85. Found (percent): C, 71.44; H, 4.09; N, 8.65.

Example 7

A mixture of 4.39 g. of the hydrazide of the formula

(60)
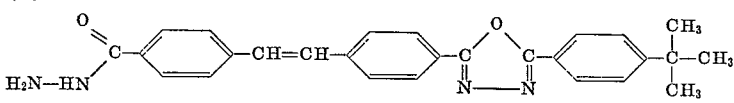

3.16 g. of 4'-carbethoxystilbene-4-carboxylic acid chloride of the formula

(61)
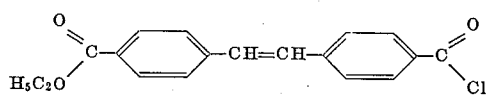

2.4 g. of pyridine and 75 ml. of anhydrous ortho-dichlorobenzene is heated in the course of 15 minutes to 100 to 110° C. while being stirred, then stirred on for one hour at this temperature and then heated to 170° C. within 15 to 30 minutes. While vigorously stirring the faintly yellow suspension of the reaction product, 3.0 g. of thionylchloride are dropped in at 165 to 170° C. within 15 minutes. The batch is stirred on for 5 minutes at this temperature, cooled to about 5° C. and during the cooling 100 ml. of methanol are added. After suctioning, washing with methanol and drying there are obtained about 6.2 g. (=88.8% of theory) of 4-[5"-para-tertiary butylphenyl-1",3",4"-oxidiazolyl-(2")] - 4'-[5'''-(4'''''-carbo-ethoxy-stilbenyl - (4''''')) - 1''',3''',4''' - oxdiazolyl-(2'']-stilbene of the formula

(62)
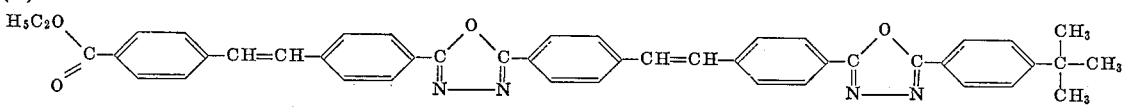

which after having been recrystallized three times from much ortho-dichlorobenzene is obtained in the form of a faintly yellow, finely crystalline powder melting at 351 to 352° C.

Analysis.—$C_{45}H_{38}O_4N_4$, mol. weight, 698.79. Calculated (percent): C, 77.34; H, 5.48; N, 8.02. Found (percent): C, 77.38; H, 5.52; N, 7.95.

The stilbene derivatives of the Formulae 60 and 61 used as starting material can be prepared thus:

A solution of 324 g. of stilbene-4,4'-dicarboxylic acid diethyl ester in 1 liter of ethanol and 4 liters of dioxane is mixed at 40° C. with 100 ml. of 10 N-sodium hydroxide solution. After stirring for 1 hour at 40° C. the resulting thick, cream colored paste is cooled to about 20° C., suctioned, washed with dioxane and thoroughly expressed. The moist filter cake is stirred for 2 hours in 10 liters of 5% hydrochloric acid, suctioned and washed neutral with water. The crude suction filter cake is stirred for 60 minutes in 2 liters of N-aqueous triethanolamine solution and the undissolved material is filtered off. The filtrate is acidified with concentrated hydrochloric acid, and the precipitate formed is suctioned off, washed neutral and dried, to yield about 231 of 4'-carbethoxy-stilbene-4-carboxylic acid of the formula

(63)
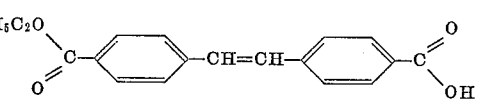

as a colorless powder whose melting point (230 to 300° C.) depends largely on the speed of heating.

Analysis.—$C_{18}H_{16}O_4$, mol. weight, 296.31. Calculated (percent): C, 72.96; H, 5.44; O, 21.60. Found (percent): C, 72.75; H, 5.40; O, 21.3.

When the acid just described is boiled for 3 hours in an excess of thionylchloride, it gives a yield of 97% of the theoretical of 4'-carbethoxy-stilbene-4-carboxylic acid chloride of the Formula 61, in the form of colorless crystals (from trichloroethylene) melting at 134 to 136° C.

Analysis.—$C_{18}H_{15}O_3Cl$, mol. weight, 314.77. Calculated (percent): C, 68.68; H, 4.80; Cl, 11.26. Found (percent): C, 68.28; H, 4.83; Cl, 11.54.

A mixture of 31 g. of 4'-carbethoxy-stilbene-4-carboxylic acid chloride of the Formula 61, 19.3 g. of para-tertiary butylbenzoic acid hydrazide and 16 g. of pyridine in 500 ml. of anhydrous ortho-dichlorobenzene is heated within 40 minutes to 100 to 110° C. while being stirred, stirred on for 1½ hours at this temperature and then raised within 30 minutes to 165° C. While vigorously stirring the almost colorless suspension, 24 g. of thionylchloride are dropped in at 165° C. within 15 minutes. The yellow reaction product is stirred on for 5 minutes at this temperature, then cooled to about 15° C.; 500 ml. of methanol are added and the precipitated 2-[4''-carbethoxy-stilbenyl-(4')] - 5 - [4'''-tertiary butylphenyl-(1''')]-1,3,4-oxdiazole of the formula

(64)
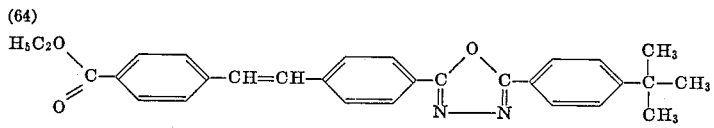

is suctioned off, washed with methanol and dried, to yield about 25.1 g. (=55.5% of theory) of a faintly yellow, finely crystalline powder melting at 198 to 199.5° C. After having been recrystallized three times from tetrachloroethylene with the aid of bleaching earth it forms pale yellow, very fine needles melting at 200.5 to 201.5° C.

Analysis.—$C_{29}H_{28}O_3N_2$, mol. weight, 452.53. Calculated (percent): C, 76.97; H, 6.24; N, 6.19. Found (percent): C, 76.67; H, 6.20; N, 6.10.

By boiling the ester of the Formula 64 in methylglycol for 48 hours under a slight reflux with an excess of hydrazine hydrate it is converted into the hydrazide of the Formula 60 which melts at 262° C. with decomposition.

In a similar manner the following dioxdiazole derivatives can be prepared:

(65) 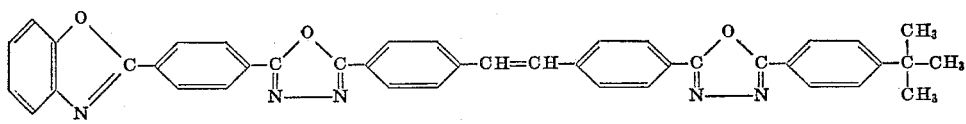

Yield: 88.9% of theory. Light yellow, finely crystalline powder from ortho-dichlorobenzene, melting at 361 to 362° C.

Analysis.—$C_{41}H_{31}O_3N_5$, mol. weight, 641.73. Calculated (percent): C, 76.74; H, 4.87; N, 10.91. Found (percent): C, 76.42; H, 4.78; N, 10.79.

(66) 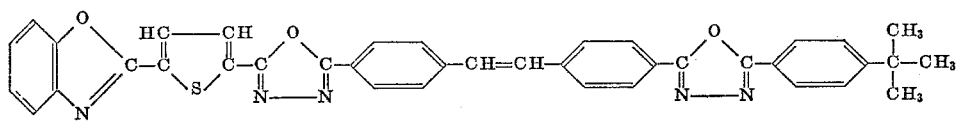

Yield: 85% of theory. Yellow, fine crystals from trichlorobenzene, melting at 379 to 380° C.

Analysis.—$C_{39}H_{29}O_3N_5S$, mol. weight, 647.76. Calculated (percent): C, 72.32; H, 4.51; N, 10.81. Found (percent): C, 71.94; H, 4.48; N, 10.79.

Example 8

3.9 g. of the compound of the formula

(67) 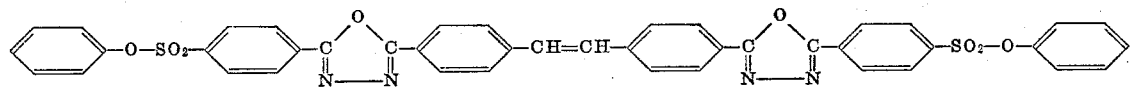

are suspended in 100 ml. of ethyleneglycolmonomethyl ether with stirring. The mixture is heated to the boil, 1.8 ml. of sodium hydroxide solution of 30% strength are added dropwise in the couse of one hour and the batch is then boiled under reflux for 16 hours. After cooling, the reaction mixture is filtered with suction, the product washed with methanol, boiled with 300 ml. of trichlorobenzene, filtered while hot, the residue washed with methanol and recrystallized twice from a mixture of 300 ml. of water and 300 ml. of pyridine with the addition of about 7 g. of sodium chloride.

Yield: about 1.6 g. (47.6% of the theory) of the compound

(68) 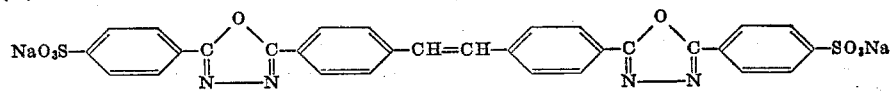

Fine, pale yellow needles.

Analysis.—$C_{30}H_{18}N_4Na_2O_8S_2$. Calculated (percent): C, 53.57; H, 2.70; S, 9.53. Found (percent): C, 53.55; H, 2.71; S, 9.26.

The compound of Formula 67 may be obtained as follows: 8.4 g. of the acid chloride of the formula

(69) 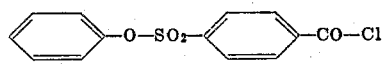

are heated at 100–115° C. in 150 ml. of boiling ortho-dichlorobenzene with 5 ml. of thionyl chloride and 2 drops of pyridine for 2 hours with stirring. The excess thionyl chloride is then distilled off in vacuo, the colorless clear solution is cooled to 20° C. and 4.2 g. of stilben-4,4'-dicarboxylic acid dihydrazide and 1.2 ml. of absolute pyridine are added. The batch is then heated for 2 hours at 75–80° C. and for one hour at 100–105° C. 2.6 ml. of thionyl chloride are then added dropwise at 160–170° C. in the course of one hour, the batch is stirred for 25 minutes at 160° C., cooled to room temperature, the crystalline product is filtered with suction and recrystallized twice from 500 ml. of trichlorobenzene with the aid of fuller's earth.

Yield: about 3.1 g. of the compound

(70) 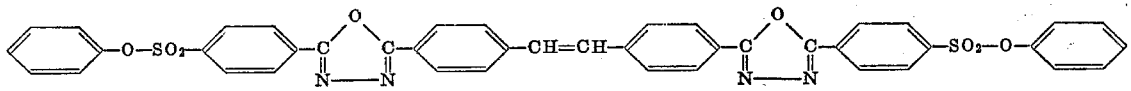

Pale yellow needles. Melting point: 335–335.5°.

Analysis.—$C_{42}H_{28}N_4S_2O_8$. Calculated (percent): C, 64.61; H, 3.61; S, 8.21. Found (percent): C, 64.60; H, 3.68; S, 8.30.

The phenyl ester of 4-sulfobenzoyl chloride of Formula 69 used as starting material may be prepared as follows: 110 g. (0.5 mol) of 4-carboxybenzene sulfochloride are introduced with cooling on an ice-bath into a solution of 188 g. (2 mols) of phenol in 500 ml. of dry pyridine in such a way that the temperature does not rise above 5° C. The batch is stirred for 30 minutes at 0–5° C., the temperature of the resulting, pale brown, clear solution is allowed to rise to room temperature, the batch is then heated within an hour to 100° C., cooled again, poured dropwise with stirring on to 2.5 kg. of ice, acidified at 0–5° C. dropwise with 450 ml. of concentrated hydrochloric acid, the white precipitate filtered with suction and washed neutral with ice-water. After drying under reduced pressure, initially at 40° C., and then at 85° C., there are obtained 74.5 g. of a grey sticky mass which by recrystallization from double the quantity of chlorobenzene yields 21.1 g. of colorless crystals melting at 208–210° C.

A further recrystallization yields the compound of the formula

(71) 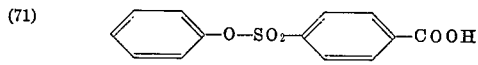

in the form of colorless crystals melting at 211–212° C.

*Analysis.*—$C_{13}H_{10}O_5S$ (278.28). Calculated (percent): C, 56.11; H, 3.62; S, 11.52. Found (percent): C, 56.18; H, 3.58; S, 11.63.

By reaction with 14.5 ml. of thionyl chloride in 100 ml. of chloroform in the presence of 0.3 ml. of pyridine for one hour at reflux temperature and subsequent evaporation there are obtained 24.5 g. of crude acid chloride of the formula

(69) 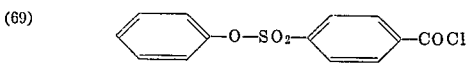

in the form of a colorless oil that on cooling crystallizes almost throughout and melts at 97–98° C. Recrystallization from methylene chloride yields colorless crystals of unchanged melting point. They are, however, very sensitive to hydrolysis and for further processing must be treated afresh with thionyl chloride.

(68) 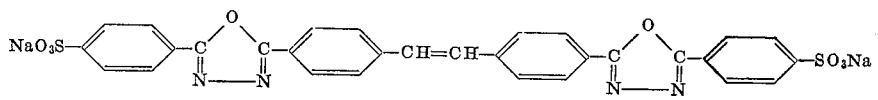

Example 9

The compound according to Formula 68 can be transformed into the corresponding disulfonic acid dichloride of the formula

(72) 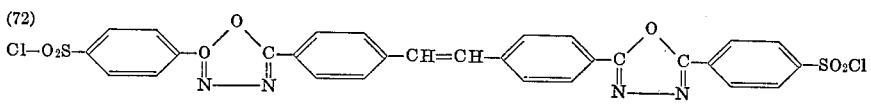

in usual manner.

33.2 g. of the crude disulfonic acid dichloride of the Formula 72 in mixture with 350 ml. of n-octylamine are heated at 75–80° C. for 3½ hours. After cooling to room temperature, the crystalline product is filtered off with suction, washed with methanol and recrystallized twice from dimethylformamide with the use of fuller's earth. Yield, about 23.2 g. (54.6% of the theoretical) of the compound

(73) 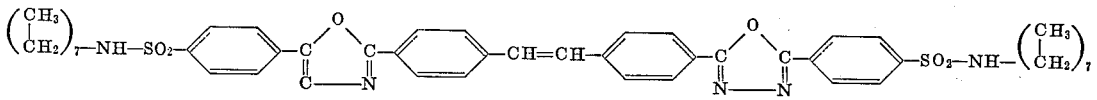

fine, pale yellow crystals, melting point >300°.

*Analysis.*—$C_{46}H_{54}N_6O_6S_2$. Calculated (percent): C, 64.92; H, 6.40; N, 9.87. Found (percent): C, 64.79; H, 6.48; N, 9.77.

By using dodecylamine instead of n-octylamine the corresponding dodecylamide is obtained. In a similar manner also the anilide, the benzylamide and the morpholide may be prepared.

Example 10

A bleached cotton fabric is washed at 60° C. for 30 minutes at a goods-to-liquor ratio of 1:30 in a liquor containing, per liter.

0.024 g. of the brightener of the formula

(68) 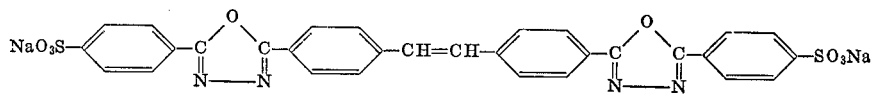

1 g. of active chlorine (javelle water)
4 g. of a detergent of the following composition:

| | Percent |
|---|---|
| Dodecylbenzene sulfonate | 15.00 |
| Sodium-lauryl sulfonate | 10.00 |
| Sodium tripolyphosphate | 40.00 |
| Calcined Glauber's salt | 25.75 |
| Sodium metasilicate | 7.00 |
| Carboxymethyl-cellulose | 2.00 |
| Ethylenediamine-tetraacetic acid | 0.25 |

After being rinsed and dried, the fabric shows a very considerable brightening effect of good fastness to light, acid and chlorine.

Example 11

At 60° C., a fabric made from polyamide fibers (Perlon) is entered at a goods-to-liquor ratio of 1:40 into a bath containing (referred to the weight of the fabric) 0.2% of the brightener of the formula and, per liter, 1 g. of 80% acetic acid and 0.25 g. of an adduct of 30 to 35 mols of ethylene oxide and 1 mol of commercial stearyl alcohol. In the course of 30 minutes, the bath is heated to the boiling temperature and so maintained for 30 minutes. After rinsing and drying, a very considerable brightening effect of very good light fastness is obtained.

Example 12

A bleached woven fabric from polyamide staple fiber (nylon spun) is treated at a goods-to-liquor ratio of 1:40 for 60 minutes at 60° C. to 100° C. in a bath containing—referred to the fibrous material—0.025% of the compound of the Formula 28 and 2 g. per liter of a dispersant (adduct from 35 mols of ethylene oxide and 1 mol of octadecyl alcohol). After having been rinsed and dried, the fabric treated in this manner displays an outstanding brightening effect.

27

When the polyamide staple fiber fabric is replaced by a polyamide filament fabric, similar good brightening effects are obtained.

Example 13

A woven fabric from polyethyleneglycol terephthalate ("Dacron") is treated on a padder with an aqueous dispersion containing per liter of water 2 g. of the compound of the Formula 22 or 28 and as dispersant 2 g. of the adduct from 35 mols of ethylene oxide and 1 mol of octadecyl alcohol. After drying at 70° C., followed by heating at 220° C. for 30 seconds, excellent white effects are obtained which have good fastness to light.

Example 14

10 kilograms of a polyamide in chip form, manufactured from hexamethylenediamine adipate in the known manner, are mixed with 30 g. of titanium dioxide (rutile modification) and 5 g. of a compound of one of the Formulae 22, 25, 33, 34, 36 or 52 in a tumbler for 12 hours. The chips treated in this manner are then melted in a boiler from which the atmospheric oxygen has been displaced with superheated steam and which is heated by oil or diphenyl vapour at 300 to 310° C., and the melt is stirred for ½ hour, then expressed through a spinneret under a nitrogen pressure of 5 atmospheres (gauge), and the filament spun in this way is reeled on a spinning bobbin after cooling. The resulting filament displays an excellent brightening effect which is stable towards heat-setting and has good fastness to washing and light.

When the starting material used in the above example is a polyamide manufactured from ε-caprolactam, an excellent brightening effect which is stable to heat-setting and has good fastness to washing and light is likewise obtained.

Example 15

100 g. of polyester granulate from polyterephthalic acid ethyleneglycol ester are intimately mixed with 0.04 g. of the compound of the Formula 22 or 52 and fused at 285° C. while being stirred. When the spinning mass is spun through a conventional spinneret, considerably brightened polyester fibers are obtained.

If desired, the compound of the Formula 22 or 52 may alternatively be added to the starting materials before or during the polycondensation leading to the polyester.

Example 16

100 g. of polypropylene "fiber grade" are intimately mixed with 0.02 g. of the compound of the Formula 32 and fused at 280 to 290° C. while being stirred. After spinning through conventional spinnerets and stretching, polypropylene fibers are obtained which display an excellent brightening effect which is fast to light.

Example 17

An intimate mixture of 100 g. of polyvinylchloride, 3 g. of stabilizer ("Advastol BD 100"; barium-cadmium complex), 2 g. of titaninum dioxide, 59 ml. of dioctylphthalate and 0.02 to 0.1 g. of the compound of the Formula 25 is rolled on a calender heated at 150 to 155° C. to form a foil. The polyvinylchloride foil obtained in this manner has a significantly higher white content than a foil that does not contain the dioxdiazole compound.

A good optical brightening effect is also obtained when polyvinylchloride is replaced by polyethylene and the treatment is performed at a temperature of 130 to 135° C.

We claim:

1. The 4,4'-disubstituted stilbene compound of the formula

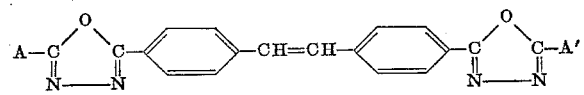

wherein A and A' represents a member selected from the group consisting of the phenyl, naphthyl, styryl, stilbenyl, pyridyl, thienyl, furoyl, benzoxazolyl thienyl and benzoxazolyl phenyl residue which itself contains one to two substituents Q, in which Q stands for a member selected from the group consisting of hydrogen, chlorine, bromine, alkyl containing 1 to 18 carbon atoms, alkoxy containing 1 to 8 carbon atoms, phenyl, carboxyl, carboxylic acid alkyl ester of 1–18 carbon atoms, carboxylic acid phenylalkylester with 1–4 carbon atoms in the alkyl, carboxylic acid amide, nitrile, carboxylic acid alkyl amide with 1 to 12 carbon atoms, carboxylic acid morpholide, carboxylic acid anilide, carboxylic acid phenylalkyl amide with 1–4 carbon atoms in the alkyl, sulfonic acid, sulfonic acid alkyl ester containing 1–18 carbon atoms, sulfonic acid benzylester, sulfonic acid phenyl ester and sulfonic acid amide, sulfonic acid alkyl amide containing 1 to 18 carbon atoms, sulfonic acid benzylamide and sulfonic acid anilide.

2. The 4,4'-symmetrical disubstituted stilbene compound according to claim 1 which corresponds to the formula

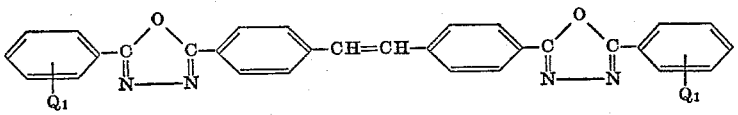

where $Q_1$ represents a member selected from the group consisting of hydrogen, chlorine, bromine, alkyl containing 1–8 carbon atoms, alkoxy containing 1 to 8 carbon atoms, phenyl, carboxyl, carboxylic acid alkyl ester with 1 to 8 carbon atoms in the alkyl, carboxylic acid amide, sulfonic acid, sulfonic acid alkyl ester with 1 to 8 carbon atoms and sulfonic acid amide.

3. The symmetrical stilbene compound according to claim 1 which corresponds to the formula

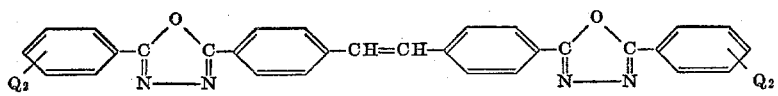

where $Q_2$ represents an alkyl group containing to 4 carbon atoms.

4. The compound according to claim 1 of the formula

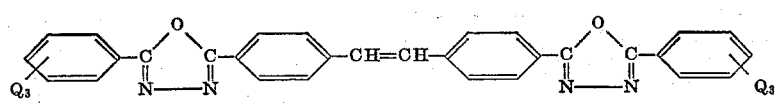

wherein $Q_3$ represents the sulfonic acid group, water soluble salt of the sulfonic acid, sulfonic acid alkyl amide containing 1 to 12 carbon atoms, sulfonic acid alkyl ester containing 1 to 12 carbon atoms and the sulfonic acid phenyl ester which may be substituted by lower alkyl.

5. The compound according to claim 1 of the formula

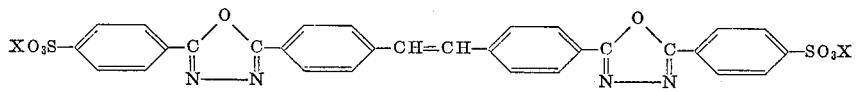

wherein X stands for hydrogen, alkali metal, ammonium or an amine salt ion.

6. The compound according to claim 1 of the formula

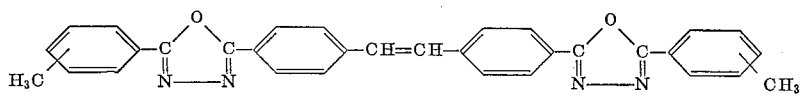

7. The compound according to claim 1 of the formula

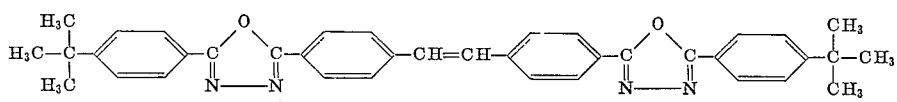

8. The compound according to claim 1 of the formula

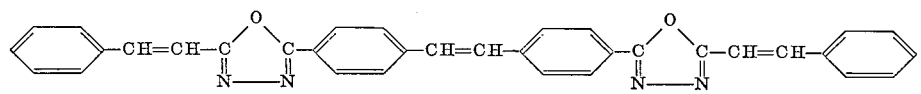

9. The compound according to claim 1 of the formula

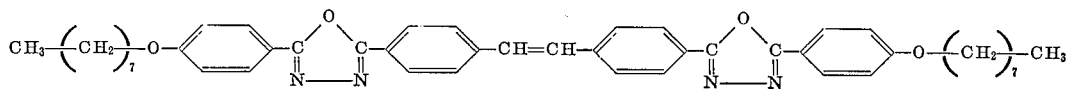

10. The compound according to claim 1 of the formula

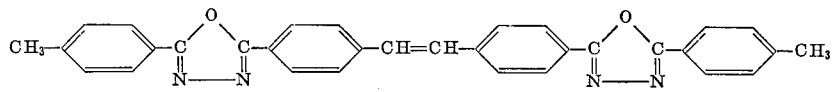

11. The 4,4'-disubstituted stilbene compound as claimed in claim 1 of the formula A'—C\\O/C—⟨ ⟩—CH=CH—⟨ ⟩—C\\O/C—A'
   ‖   ‖              ‖   ‖
   N———N              N———N where A' represents a member selected from the group consisting of a phenyl, naphthyl and styryl residue which itself may contain one to two substituents Q, in which Q stands for a member selected from the group consisting of hydrogen, chlorine, bromine, alkyl containing 1–8 carbon atoms, alkoxy containing 1–8 carbon atoms, phenyl, carboxyl, lower alkyl carboxylic acid ester, carboxylic acid amide, nitrile, sulfonic acid, lower alkyl sulfonic acid ester and sulfonic acid amide.

References Cited

UNITED STATES PATENTS 3,351,591  11/1967  Siegrist et al. _____ 260—240

HENRY R. JILES, Primary Examiner

G. T. TODD, Assistant Examiner

U.S. Cl. X.R.

96—1, 104; 106—193; 117—33.5, 102; 162—162; 252—301.2; 260—37, 41, 240.1, 471, 475, 558, 559

PO-1050
(5/69)

UNITED STATES PATENT OFFICE
CERTIFICATE OF CORRECTION

Patent No. 3,511,834            Dated May 12, 1970

Inventor(s) ADOLF EMIL SIEGRIST ET AL

It is certified that error appears in the above-identified patent and that said Letters Patent are hereby corrected as shown below:

Column 28, claim 3, line 1 after the structural formula, insert immediately after the word "containing" the number --- 1 ---.

Signed and sealed this 15th day of June 1971.

(SEAL)
Attest:

EDWARD M. FLETCHER, JR.
Attesting Officer

WILLIAM E. SCHUYLER, JR.
Commissioner of Patents